United States Patent [19]
van Andel et al.

[11] 3,968,637
[45] July 13, 1976

[54] YARN BREAK DETECTION BY MEANS OF TRIBOELECTRICAL NOISE SIGNAL

[75] Inventors: Eleonoor van Andel, Twekkelo; Garrit J. Hilferink, Arnhem; Theodorus P. J. Lendering, Apeldoorn, all of Netherlands

[73] Assignee: Akzona Incorporated, Asheville, N.C.

[22] Filed: Aug. 5, 1974

[21] Appl. No.: 494,903

[30] Foreign Application Priority Data
Aug. 6, 1973  Netherlands ..................... 7310809

[52] U.S. Cl. .................................................. 57/81
[51] Int. Cl.² ............................................ D01H 13/16
[58] Field of Search .................. 57/34 R, 52–54, 57/80, 81, 19, 106; 242/35.5 R, 35.6 R, 36; 338/2, 5

[56] References Cited
UNITED STATES PATENTS

| | | |
|---|---|---|
| 3,272,048 | 9/1966 | Archer ................................ 57/81 |
| 3,438,189 | 4/1969 | Gasser et al. ........................ 57/81 |
| 3,562,734 | 2/1971 | Hotchkiss ........................ 57/81 X |
| 3,659,409 | 5/1972 | Saunders .......................... 57/34 R |
| 3,688,958 | 9/1972 | Rydborn .......................... 57/81 X |
| 3,723,933 | 3/1973 | Loepfe et al. ..................... 338/2 |
| 3,840,869 | 10/1974 | Pugh ................................ 57/81 X |

*Primary Examiner*—Donald E. Watkins
*Attorney, Agent, or Firm*—Craig & Antonelli

[57] ABSTRACT

An apparatus for detecting a yarn break on a textile machine having at least one yarn processing position where the transport of a yarn is to be monitored, comprising a triboelectric signal generator located at said processing position for producing a signal indicating the transport of the yarn and a signal detection circuit for amplifying and rectifying the signal to provide an output indicative of a yarn break.

14 Claims, 5 Drawing Figures

YARN BREAK DETECTION BY MEANS OF TRIBOELECTRICAL NOISE SIGNAL

The invention relates to an apparatus for detecting a yarn break by means of a triboelectrical noise signal, and more particularly to a yarn stop motion device for use with yarn transporting apparatus having at least one yarn processing position where the transport of the yarn is to be monitored, which includes a signal generator and a signal detection circuit operatively associated with each yarn processing position.

In addition, this invention relates to a textile machine, particularly a ringtwisting machine utilizing this yarn break detecting apparatus as well as a scanning apparatus for monitoring yarn breaks at a plurality of yarn processing positions of the textile machine.

The signal generators suitable for the purposes of this invention are in the form of triboelectric noise signal generators. These are elements with which use is made of the contact between two bodies, i.e. a yarn, and an electrical conductor, resulting for instance in an electrostatic charge generated by friction, for detecting interruptions in the yarn transport.

This invention is particularly directed to a ringtwisting machine provided with a ring spindle, a metal top eyelet in the form of a so-called "pig-tail" which is positioned over the center of the ring spindle and serves to guide the twisting yarn thread ballooning about the ring spindle, and a thread stop motion for detecting faults in the thread transport, particularly yarn breaks. The triboelectric noise signal generator stop motion comprises an insulated electric conductor which is placed just below the pig-tail and comes into intermittent contact with the ballooning yarn and is connected to an amplifier and rectifier for, respectively, amplifying and rectifying the triboelectric voltage produced in the conductor.

A preferred embodiment of this ringtwisting machine is characterized in that the conductor is connected to the amplifier through an RC filter which filters out signals with a mains frequency.

Preferably the amplifier has a low-frequency band filter which mainly transmits signals in the frequency range of 200 to 1000 Hz. The ringtwisting machine equipped with the above-described yarn stop motions is also excellently suitable for monitoring its many ringtwisting positions by having the stop motions scanned with the aid of a scanning apparatus.

It will be understood that the term "yarn" is used in a generic sense to include all multifilament groups such as tows as well as individual threads, filaments, and the like fibrillary materials.

This scanning apparatus comprises a first and a second common scanning line running past all the signal generators. The scanning lines are connected to a signal processing device present at a central control system, and to each of the signal generators there is connected a scanner which in its turn is connected to at least one of the scanning lines. The scanner comprises a switching device provided with a time delay device for at least the 2nd up to and including the nth signal generator and with a switching element controlled by the time delay device, with the aid of which switching element the corresponding signal generator may be connected to the central control system through a scanning line. Also, the switching device of the first signal generator is connected to a control unit which supplies a control signal under the influence of which the switching element connects the first signal generator to the central control system, and the output of each time delay device is connected to the input of the next time delay device.

In the scanning apparatus to be used in this invention each scanner is sequentially triggered and each scanner is allowed to "read out" the corresponding signal generator over a period predetermined by the time delay device. To an apparatus so constructed there may be connected a large number of signal generators without this involving the use of an elaborate assembly of cables. A suitable variant construction of this scanning apparatus, more particularly for the scanning of a number of detectors which supply an electrical signal that may assume values of at least two distinctly different levels is characterized in that a scanner is connected to the first and to the second scanning lines and the scanner comprises a capacitive circuit which is connected between the coresponding signal generator and one of the scanning lines.

With this construction it is possible to obtain information about the signal of the corresponding signal generator by observation of the state of charging of the charging device. If, for instance, a process may be in either of two possible states, the state of charging may be indicative of the state in which the process is.

a variant of the last-mentioned construction of the scanning apparatus is further characterized in that the scanners are connected in parallel between the first and the second scanning lines. In that case it is preferred that the capacitive circuit and the switching element are connected in series between the first and the second scanning lines. A suitable construction of this apparatus is characterized in that the time delay device comprises an RC-circuit.

Further it is recommended that the time delay device is provided with a bistable element which controls the switching state of the switching element.

By the term "bistable element" it is meant an element that can be made to assume two distinctly different stable states, the one state very rapidly changing over to the other under the influence of an external signal. In this way a distinct switching action of the switching element is ensured.

The bistable element may be a Schmitt trigger. Preferably, however, it is formed by a comparator. As switching element may be used, for instance, a relay or a switch transistor. However, it is preferred that the switching element is formed by a thyristor because of its fast switching action.

The invention will be further described with reference to several embodiments shown in the accompanying drawings, wherein.

Figure 1:
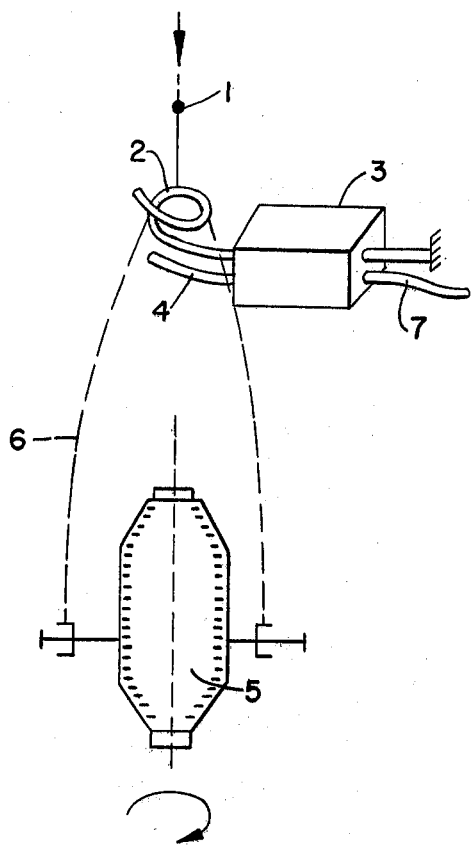
FIG. 1 represents a triboelectric noise signal generator for a ringtwisting machine.

FIG. 1 shows an apparatus for detecting yarn breaks in the transport of yarns on a ringtwisting machine. This machine as a rule comprises a number of processing positions having a ringtwisting unit. At each position one yarn thread is twisted by a ringtwisting unit. In the figure only one of the many ringtwisting units at its position is shown. The thread 1 passes through a metal top eyelet in the form of a pig-tail 2, which is attached to an earthed frame of the ringtwisting machine. Mounted on the pig-tail is a holder 3 of insulating material. In the holder 4 and below the pig-tail 2 there is contained an electrical conductor 4 made of the same material as the pig-tail. The thread 1 which is rotated by a conventional ring spindle is wound on the bobbin or pirn 5, which is schematically shown. During this rotation there forms a thread balloon 6. The ballooning thread 1 periodically comes into contact with the conductor 4. Consequently a fluctuating electrostatic charge is induced in the conductor. This electrostatic charge can be taken off as a signal through the shielded cable 7 connected to the conductor. When the yarn thread breaks or comes to a stop, no charge is induced in the conductor 4, i.e. no signal is produced.

Figure 2:
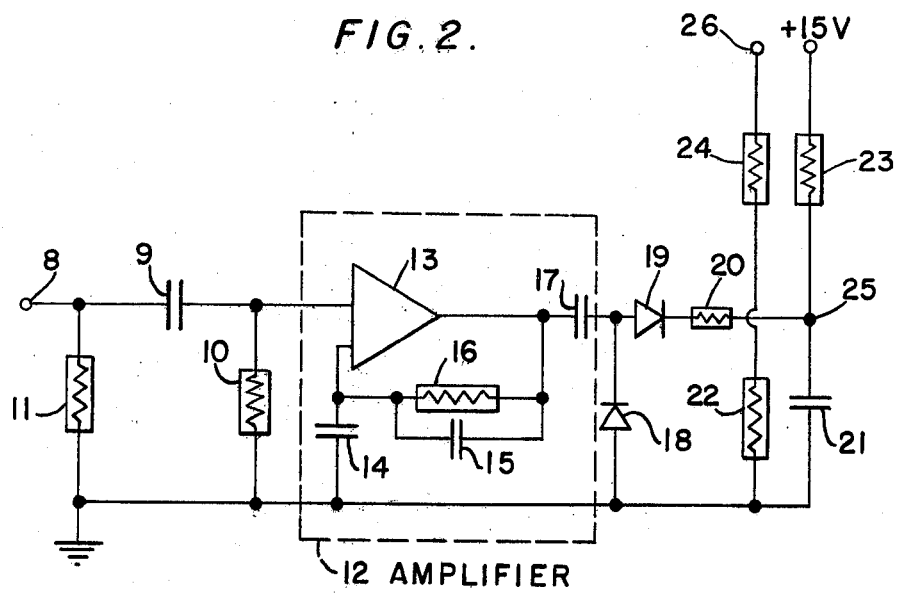
FIG. 2 shows a circuit for processing the signal from the generator according to FIG. 1.

FIG. 2 shows a very suitable detection circuit by which the presence of an electric charge on the conductor 4 can be established. At point 8 the cable 7 leading from the conductor 4 is connected. The signal, i.e. the generated charge passes through an RC-filter consisting of a capacitor 9 and a resistor 10 which eliminates signal components with a mains frequency. The resistor 11 prevents the capacitor 9 from being charged up to a too high a D.C. voltage. The signal filtered off in this way is amplified in the amplifier circuit 12. This circuit comprises an operational amplifier 13, which is so dimensioned, inter alia, with the circuit comprising the capacitors 14, 15 and the resistor 16, that mainly signals in the frequency range of 200 – 1000 Hz are amplified. Through a capacitor 17 the amplified signal is passed to a rectifier circuit comprising the rectifiers 18 and 19. Through the resistor 20 the capacitor 21 is charged up to the rectified voltage. As the resistor 20 has a relatively low ohmic value, the capacitor 21 is rapidly charged. The discharging, however, must take place through a resistor 22 of a relatively high resistance value, as a result of which it proceeds less rapidly than the charging. In the case where the detection circuit is connected to the embodiment of scanning apparatus according to FIG. 5 (hereinafter described), the resistors 23 and 24 are connected to the point 25. The point 26 is then connected to the point 64 of the scanning apparatus of FIG. 5 or to a corresponding point in a different embodiment of the scanning apparatus.

Figure 3:
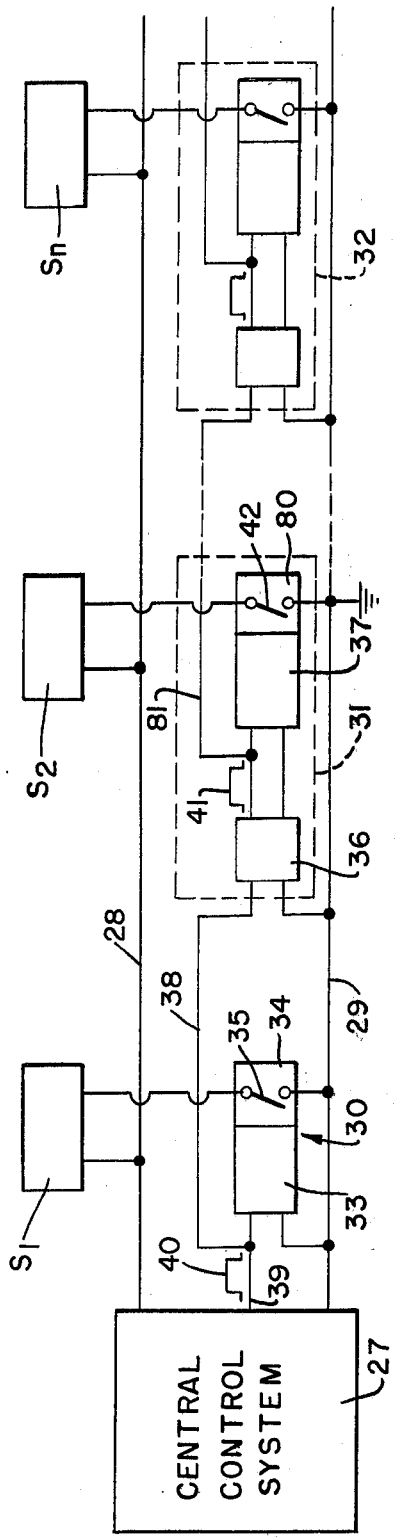
FIG. 3 is a circuit diagram of a possible embodiment of a scanning apparatus to be used in monitoring the plurality of yarn processing positions of a textile machine wherein yarn faults are detected in accordance with the invention.

When yarn break detector system of this invention (as shown in FIGS. 1, 2 and 3) was used on a drawtwisting machine on which dtex 44 f 10 nylon 6 yarns were drawn and subsequently twisted at a drawing speed of 755 m/min., a voltage of 10 V was measured on the capacitor 21. When the yarn had stopped, the voltage was 1.5 V, so that two distinctly different signal levels were obtained. The drawtwisting machine was equipped with ringtwisting units and consequently formed a ringtwisting machine according to the invention.

In the diagram of FIG. 3 the reference characters $S_1$, $S_2$ . . . , $Sn$ refer to a number of differently situated tribolelectric noise signal generators which can be "read out" at a central control system 27. These generators are of the type disclosed in FIG. 1. Running past the signal generators $S_1, S_2 \ldots Sn$ are two scanning lines 28, 29 which are connected to a signal processing device present at the central control system 27. This system includes a current or voltage detector and a pulse generator. For one of the scanning lines use may be made, if required, of the earth. The signal generators may serve, for instance, to pass on certain measured values to the central control system, at which they are displayed on some screen by means of the signal processing device, recorded, stored in a memory, or processed in some other way.

Each signal generator is connected to a scanner; the scanners are referred to by the reference numerals 30, 31 and 32. The scanner 30 comprises a control circuit 33, e.g. a relay core and a switching member 34 which is controlled by the circuit 33. The switching member 34 comprises a switching element which is shown in FIG. 3 as a single-pole switch 35. At its one end the switch 35 is connected to the scanning line 29 and at its other end to a line connecting with the signal generator $S_1$. At some other point the signal generator $S_1$ is connected to the scanning line 28. The input of the control circuit 33 is connected to the central control system 27 and to the scanning line 29.

The scanner 31 for the signal generator $S_2$ only differs from the one for the signal generator $S_1$ in that the former also comprises a time delay device 36 whose output is connected to the control circuit 37. The input of the time delay device 36 connects through a line 38 with a line 39 between the central control system and the scanner 30 of the first signal generator $S_1$.

The scanners of the 3rd up to and including the nth signal generator are identical with that of the 2nd signal generator 2, the output of each time delay device being coupled to the input of the next time delay device. The operation of the apparatus is as follows: from the central control system 27 a control signal is passed to the control circuit 33 of the first scanner 30. This signal has the form of a pulse, which in FIG. 1 is referred to by 40. The switch 35 now closes under the influence of the rising edge of pulse 40, so that the signal generator $S_1$ is connected to the central control system through the scanning lines 28, 29 and can subsequently be read out. The switches of all the other scanners will remain open for a while yet. The switch 35 will re-open upon termination of the control signal, i.e. under the influence of the falling edge of the pulse 40.

Meanwhile the time delay device 36 of the next scanner 31 has been activated by the pulse 40 passed on through the line 38. After the set delay time has elapsed, a pulse 41 arrives at the input of the control circuit 37. As a result, the switch 42 will close, so that now the signal generator $S_2$ is connected to the central control system 27.

Likewise, the 3rd up to and including the nth signal generators are successively read out in that the corresponding scanners are successively triggered.

In the above-described embodiment the duration of the pulses 40, 41, etc. must be sufficiently long to permit reading out of the signal generators. However, it is also possible for the scanners to be triggered with a pulse of short duration if provisions have been made for the switches to be automatically re-opened after the required reading out time.

Figure 4:
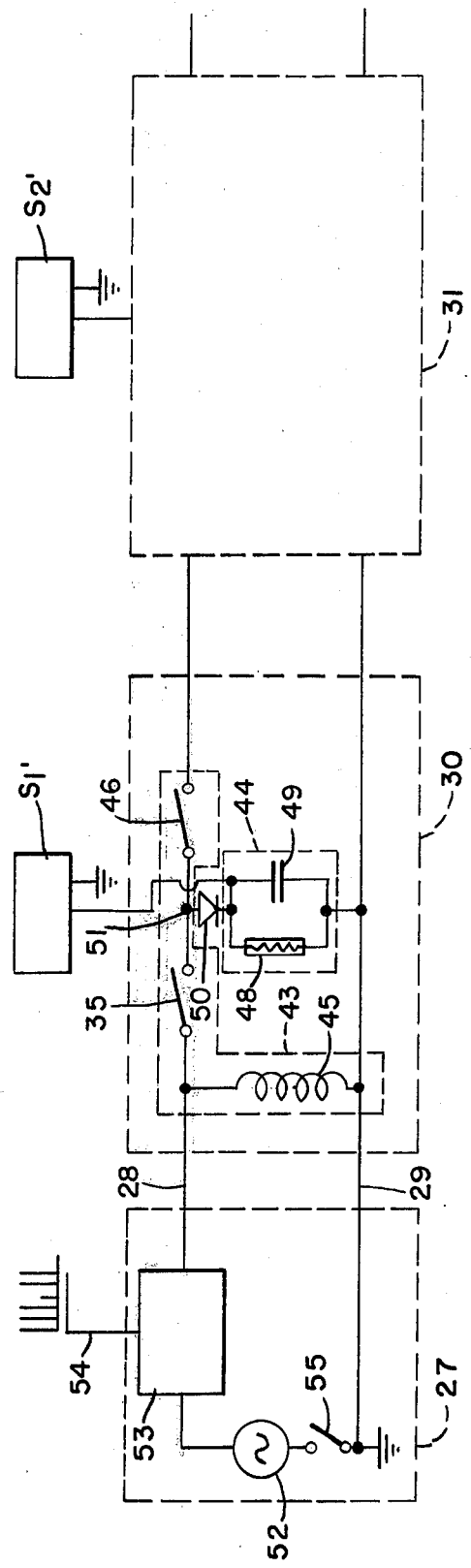
FIGS. 4 and 5 show two different embodiments of the scanning apparatus.

FIG. 4 represents a different embodiment of the scanning apparatus used in the invention. Corresponding parts are referred to by like reference numerals.

The scanner 30 comprises a switching device 43 and a capacitive circuit 44. The switching device 43 is formed by a reed relay with an actuating coil 45 and two switches 35 and 46, which normally are open. The switch contacts 35, 46 are connected in series with the scanning line 28. The actuating coil 45 is connected between the scanning lines 28, 29. The device 44 comprises an RC-circuit 48, 49 which is connected between the scanning lines 28, 29 through a rectifier 50, but in such a way that the switches 35, 46 are on either side of the connection 51. Connected to the RC-circuit, 44 is a signal generator in the form of a detector $S_1'$. The detectors $S_1'$, $S_2'$, etc. produce signals of two distinctly different levels, which indicate whether or not operation is trouble-free. A low signal level points to trouble-free operation, a high signal level to faulty operation. The scanner 31 for the detector $S_2'$ and all further scanners are identical with the scanner 30.

The scanning lines 28, 29 are connected to a central control system 27 comprising a voltage source 52 and a differentiator 53 with an output 54. The voltage source 52 can be switched on or off with aid of a switch 55. Operation is as follows: when the switch 55 is closed, the voltage source 52 will supply current to the actuating coil 45 of the reed relay 43 through the differentiator 53. When, after some time, the reed relay is sufficiently actuated, the contacts 35, 46 will close. The contacts of the other reed relays remain open for a while. Depending on the state of charging of the RC-circuit 48, 49 a strong or a weak charging current will flow through it and charge a capacitor 49 up to the voltage of the source 52. When the detector $S_1'$ has a low signal level, the capacitor 49 will have a relatively low charge and the charging current from the voltage source 52 will be correspondingly strong.

If, however, the signal level of the detector $S_1'$ is high ("failure"), then a relatively weak charging current will flow through the circuit 44. To the output 54 the differentiator 53 supplies pulses whose amplitude is high in the case of a strong charging current and low in the case of a weak charging current. In this way it is possible to establish at the central control system 27 whether the detector is sensing any failures.

As the contacts 35, 46 are closed, and they will remain closed as long as the switch 55 is closed, it has meanwhile been possible for the current to actuate the reed relay in the next scanner 31. The detector $S_2'$, is now read out in the same way as already explained for the detector $S_1'$. At the output 54 of the differentiator 53, there are produced, in the same sequence as that of the detectors, a train of pulses whose height is indicative of the situation at the respective detection point. For example, for the train of pulses shown at the output 54 it appears that a detector $S_4'$ has a high signal level, which points to the occurrence of faulty operation.

Figure 5:
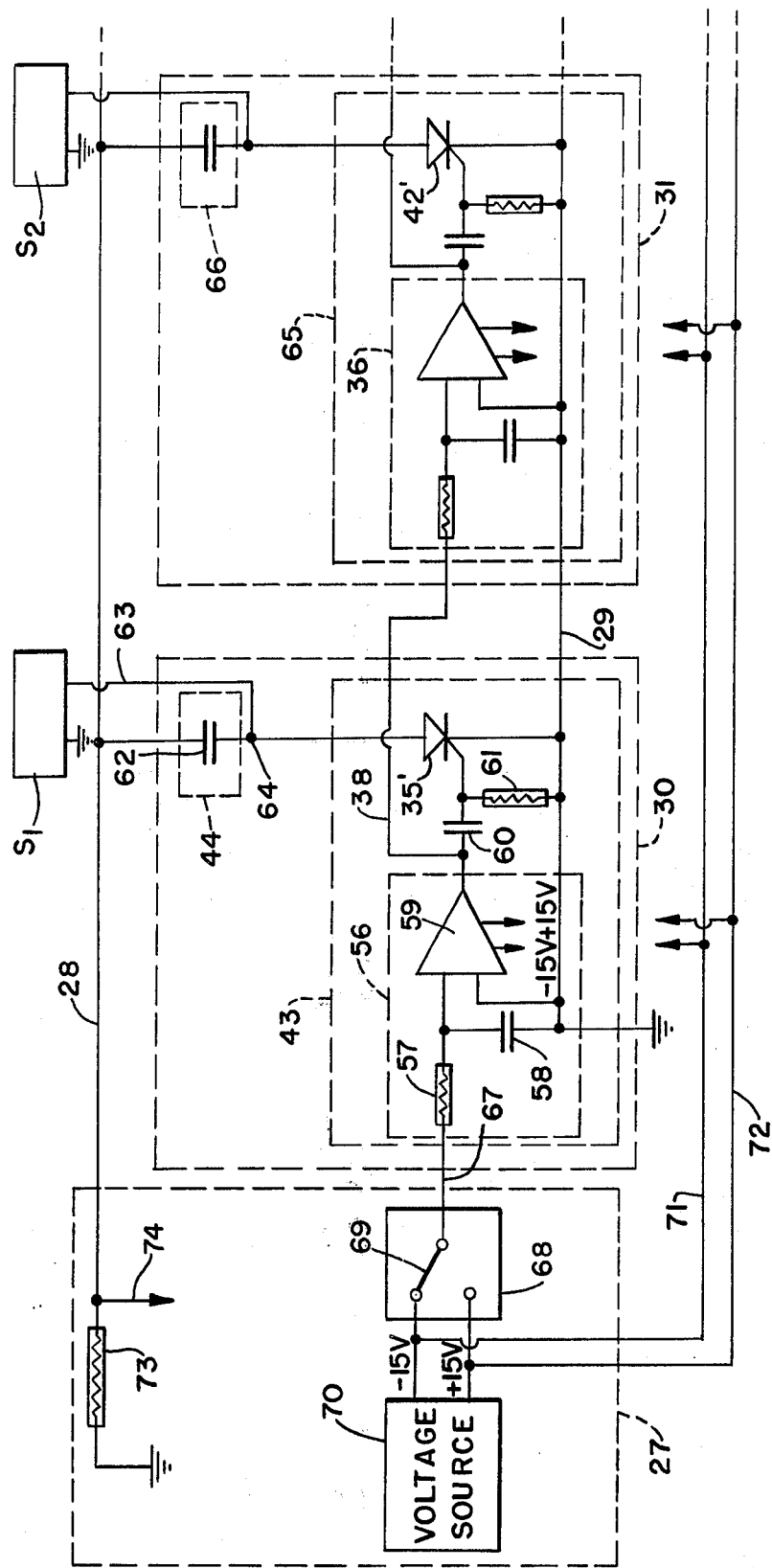

A variant of the embodiment according to FIG. 4 is shown in FIG. 5. The signal generators are referred to by the numerals $S_1$ and $S_2$. They are connected to the scanners 30 and 31, respectively. The scanner 30 comprises a switching circuit 43 and a capacitive circuit 44.

The switching device 43 comprises a time-delay circuit 56, which is made up of an ohmic resistor 57, a capacitor 58 and a bistable unit in the form of a comparator 59. The output of the comparator 59 is connected to a differentiating RC-circuit 60, 61, which is connected to the gate of a thyristor 35'. The thyristor 35' is connected in series with a capacitor 62, which forms the capacitive circuit 44. The series circuit 35', 62 is connected between the scanning lines 28, 29.

At its one end the signal generator $S_1$ is connected to earth and at its other end, through the line 63, to the point 64 of the series circuit 35', 62.

The scanner 31 of the second generator $S_2$ is connected in parallel to the scanner 30 between the scanning lines 28, 39. Its build-up is identical with that of the scanner 30. It comprises a switching device 65 and a charging device 66, the latter being connected in series to the thyristor 42'. The input of the time-delay circuit 36 connects through a line 38 with the output of the time-delay circuit 56. The scanner 30 connects through a line 67 with a control unit 68 which is contained in the central control system 27. The control unit has a switch 69, which is connected to a voltage source 70. The switch 69 serves to connect the time-delay circuit 56 to +15 V or to −15 V. Also connected to the voltage source 70, through the feed lines 71, 72 are the comparators of the scanners. In the central control system 27 there is also a resistor 73, which is connected to the scanning line 28.

The apparatus described operates as follows: when the switch 67 is operated, the charge of the capacitor 58 will be increased from −15 V to +15 V. As soon as the electric charge in the capacitor has reached a value of 0 V, the output voltage of the comparator 59 will very rapidly increase from −15 V to +15 V. The differentiating action of the RC-circuit 60, 61 will give rise to a very strong pulse-shaped voltage being applied to the gate for the thyristor 35', which will consequently become conductive for a short period. The capacitor 62 is now connected to the central control system through the conductive thyristor and the scanning lines 28, 29, as a result of which it will discharge through the resistor 63 whose voltage can be taken off through the line 64. If the signal level of the detector 35' is high, then also the voltage of the capacitor 62 will be high and a high voltage pulse will be formed at te line 74. Conversely, the voltage pulse will be small with the signal level of the detector being low. The output signal of the comparator 59 has also been passed to the time-delay circuit 36, through the line 38. This will render the thyristor 42' conductive after the delay determined by its RC-time, so that the signal generator detector $S_2$ can be read out now.

In this way each scanner triggers the next one, so that the signal generator in the form of detectors are successively scanned.

It will be appreciated from the foregoing detailed description the signal generator illustrated in FIG. 1 and the detection circuit in FIG. 2 together comprise a system wherein a yarn break or other yarn transport fault, e.g. a slow down or stoppage, provides a signal that can be used to indicate the breakage or fault as well as to control the textile machine, i.e. to stop the machine by conventional control circuitry.

What is claimed is:

1. An apparatus for detecting a yarn break on a textile machine having at least one yarn processing position where the transport of a yarn is to be monitored, which comprises a triboelectric noise signal generator located at said yarn processing position for providing a signal indicating the transport of the yarn and a signal detection circuit means for amplifying and rectifying the signal provided by said generator to provide an output indicative of a yarn break, said circuit means including an amplifier circuit providing a low frequency band filter, and said signal generator comprising an insulated electric conductor contacted by said yarn during transport thereof, to produce an electrostatic charge.

2. The apparatus of claim 1 further comprising a scanning apparatus for scanning signals provided at a plurality of yarn processing positions, which comprises a first and a second common scanning line running past all the signal generators, said scanning lines being connected to a signal processing device present at a central control system, and a scanner connected to each of the signal generators which in its turn is connected to at least one of the scanning lines, said scanner comprising a switching device provided with a time-delay device for at least the 2nd up to and including the nth signal generator and with a switching element controlled by the time-delay device for connecting the corresponding signal generator to the central control system through a scanning line, and the switching device of a first signal generator being connected to a control unit supplying a control signal which influences the switching element to connect the first signal generator to the central control system, and the output of each time-delay device being connected to the input of the next time-delay device.

3. The apparatus of claim 2, further for the scanning of a number of signal generators that supply a signal that may assume values at at least two distinctly different levels, wherein said scanner is connected to the first and to the second scanning lines and that the scanner comprises a capacitive circuit which is connected between the corresponding signal capacitive circuit which is connected between the corresponding signal generator and one of the scanning lines.

4. The apparatus of claim 3, wherein the scanners are connected in parallel between the first and the second scanning lines.

5. The apparatus of claim 4, wherein the capacitive circuit and the switching element are connected in series between the first and the second scanning lines.

6. The apparatus of claim 5, wherein the time-delay device comprises an RC-circuit.

7. The apparatus of claim 5, wherein the time-delay device is provided with a bistable element which controls the switching state of the switching element.

8. The apparatus of claim 7, wherein the bistable element is formed by a comparator.

9. An apparatus of claim 8, wherein the switching element is formed by a thyristor.

10. A textile apparatus which comprises a ringtwisting machine comprising a ring spindle, a yarn guide means that is positioned over the center of the ring spindle and that serves to guide a twisting yarn ballooning about the ring spindle, and means for detecting faults in the transport of yarn within said ringtwisting machine, said detecting means comprising an insulated electric conductor placed just below the yarn guide means and in intermittent contact with the ballooning yarn, said conductor being connected to an amplifier and rectifier for, respectively, amplifying and rectifying the triboelectric voltage produced in the conductor to produce an indication of a fault in the yarn transport, said amplifier comprising a low-frequency band filter.

11. The apparatus of claim 10, wherein the conductor is connected to the amplifier through an RC-filter which filters out signals with a mains frequency.

12. The apparatus of claim 10, wherein the low-frequency band filter mainly transmits signals in the frequency range of 200 to 1000 Hz.

13. The apparatus of claim 10, further comprising a scanning apparatus for monitoring a number of said detecting means on said ringtwisting machine.

14. The apparatus of claim 1, wherein the low-frequency band filter mainly transmits signals in the frequency range of 200 to 1000 Hz.

* * * * *